Figure 4:
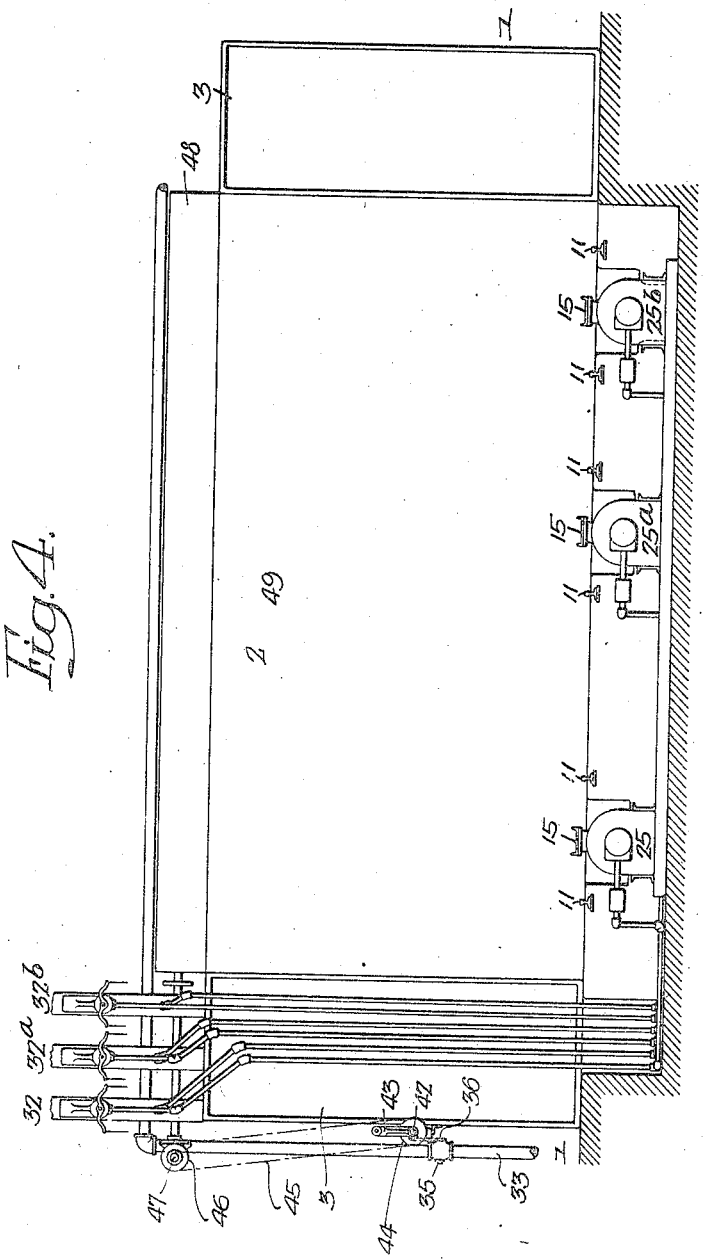

E. B. AYRES.
DRYING APPARATUS.
APPLICATION FILED JUNE 4, 1915.
1,161,587.
Patented Nov. 23, 1915.
7 SHEETS—SHEET 1.
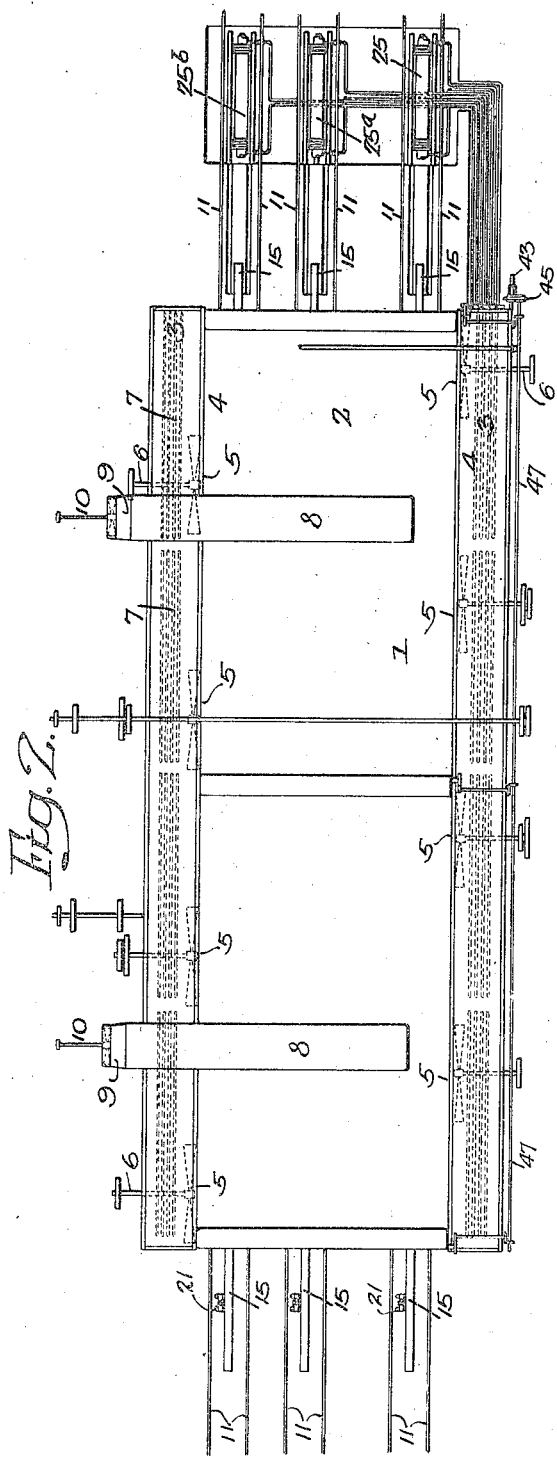
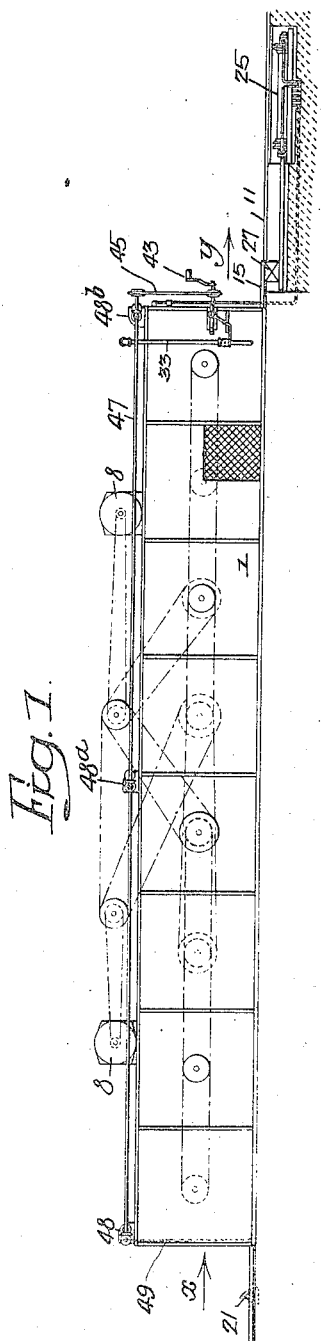
Inventor
Elwood B. Ayres
by his Attorneys
Howson & Howson

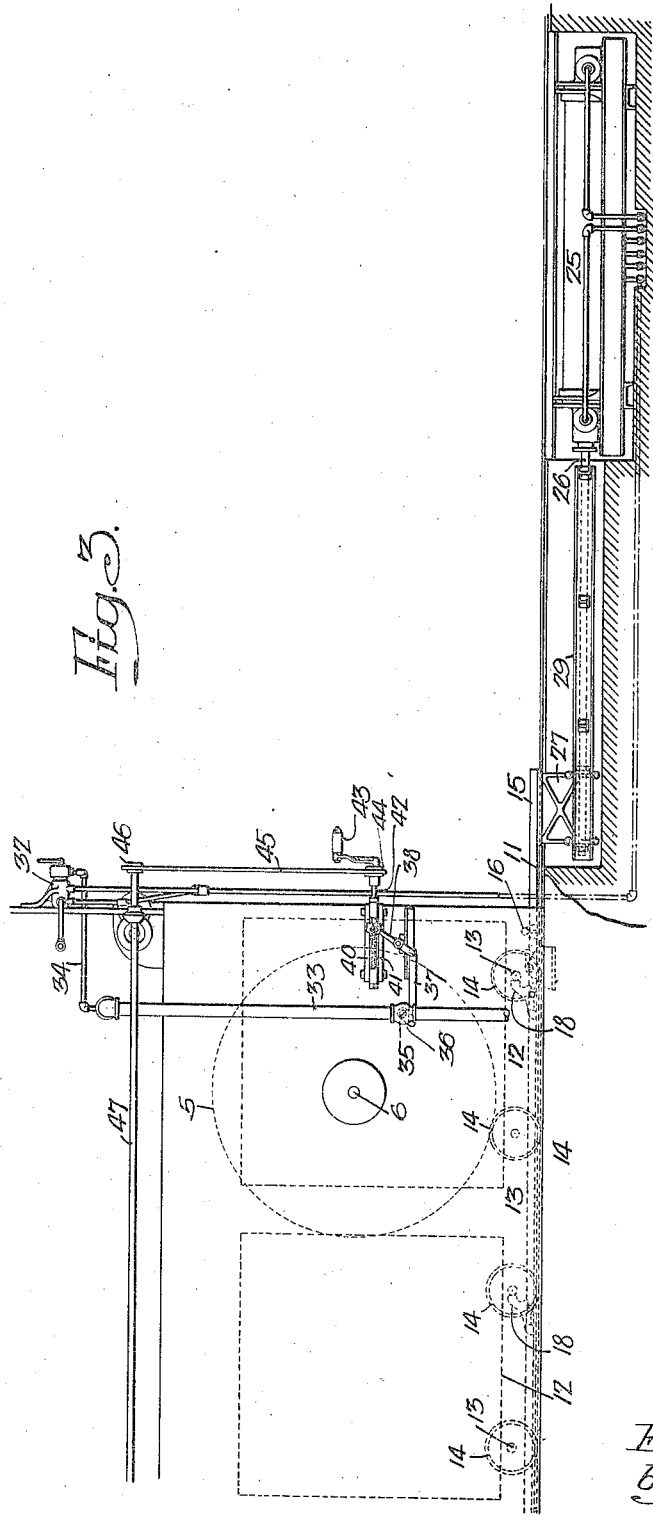

E. B. AYRES.
DRYING APPARATUS.
APPLICATION FILED JUNE 4, 1915.

1,161,587.

Patented Nov. 23, 1915.
7 SHEETS—SHEET 3.

Inventor—
Elwood B. Ayres.
by his Attorneys
Howan & Howan

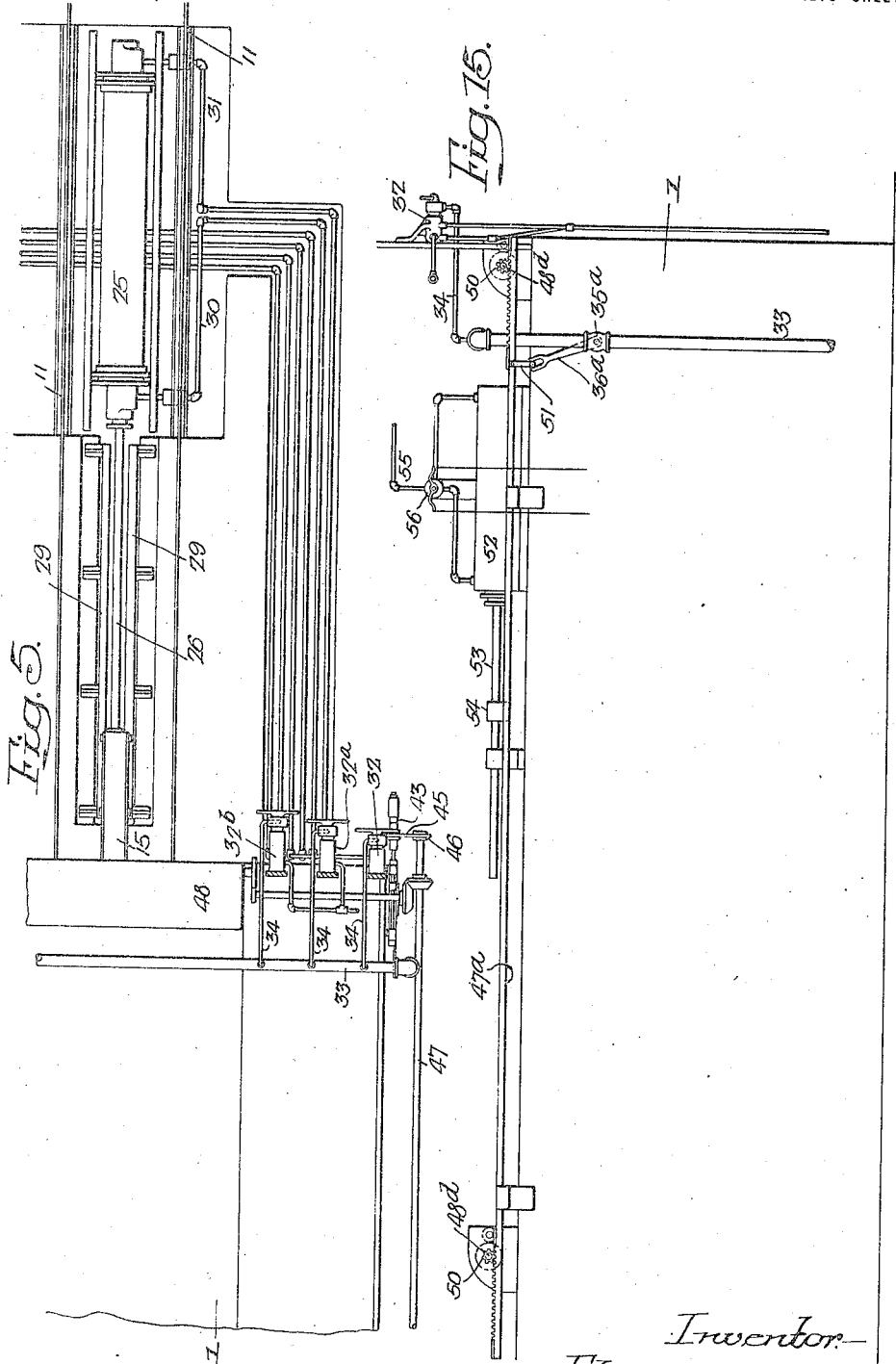

E. B. AYRES.
DRYING APPARATUS.
APPLICATION FILED JUNE 4, 1915.
1,161,587.
Patented Nov. 23, 1915.
7 SHEETS—SHEET 5.
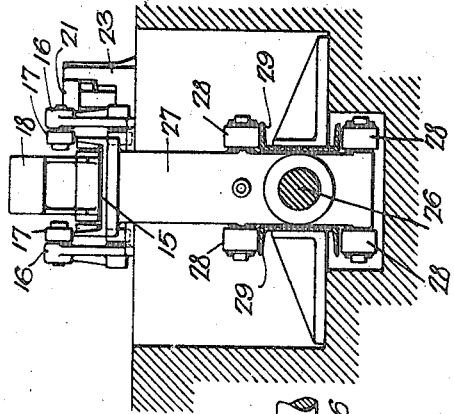
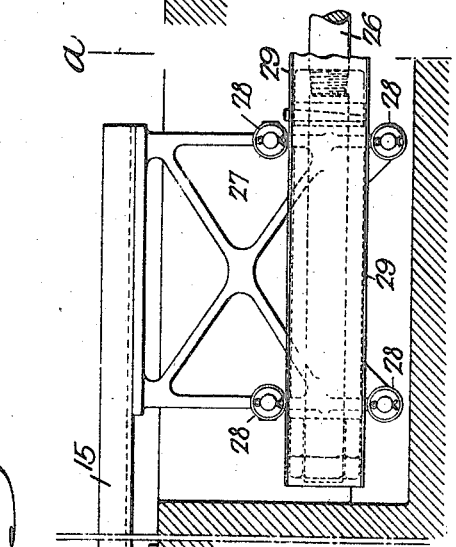
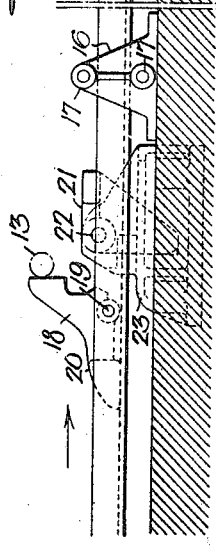
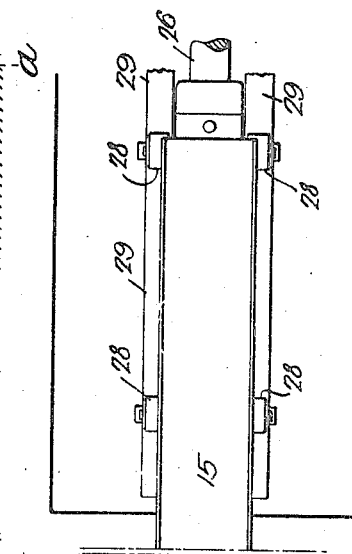
Inventor—
Elwood B. Ayres.
by his Attorneys—
Howson & Howson E. B. AYRES.
DRYING APPARATUS.
APPLICATION FILED JUNE 4, 1915.
1,161,587.
Patented Nov. 23, 1915.
7 SHEETS—SHEET 6.
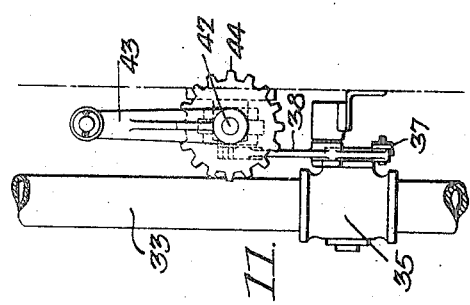
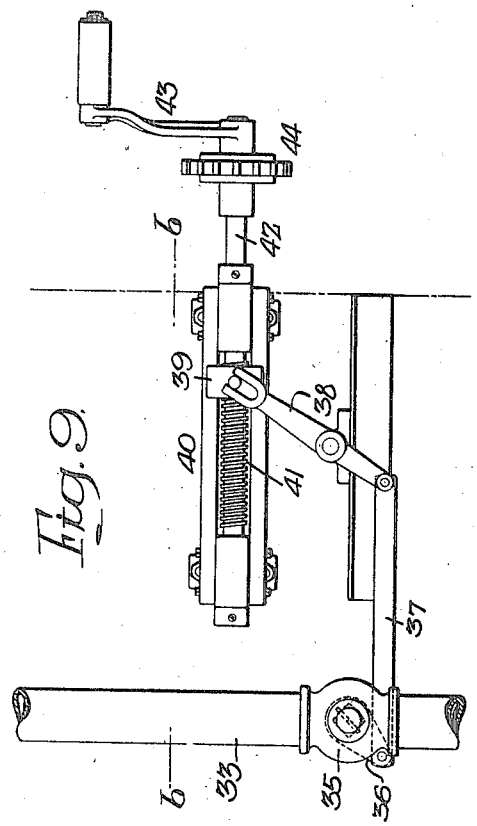
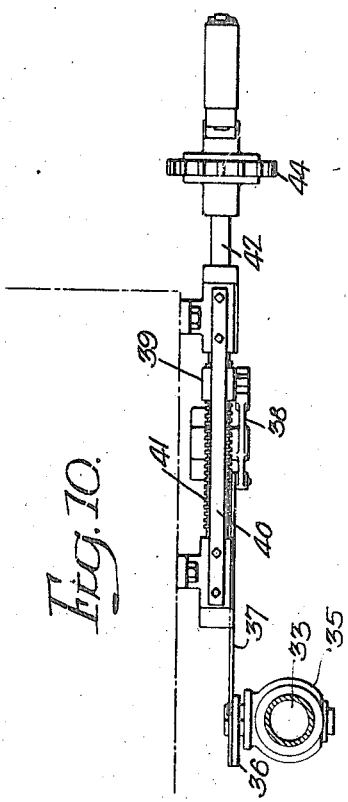
Inventor-
Elwood B. Ayres.
by his Attorneys

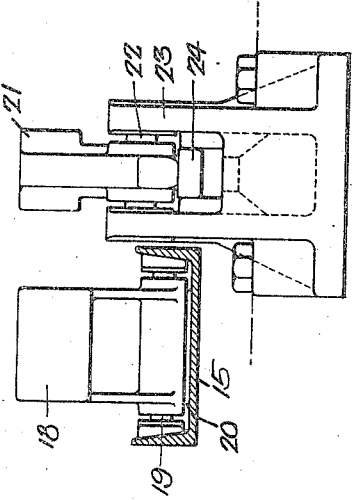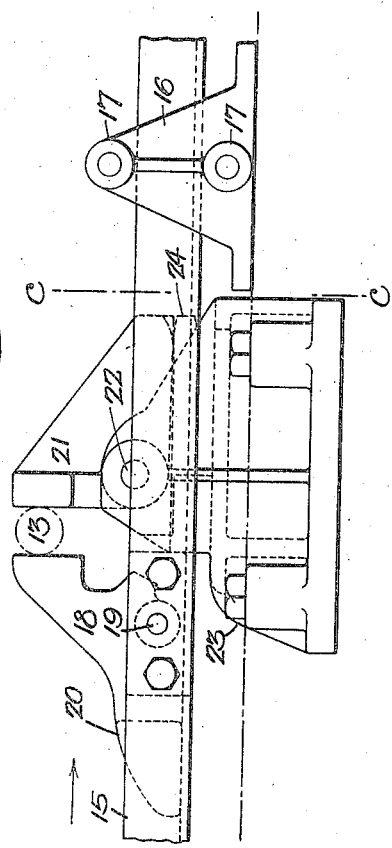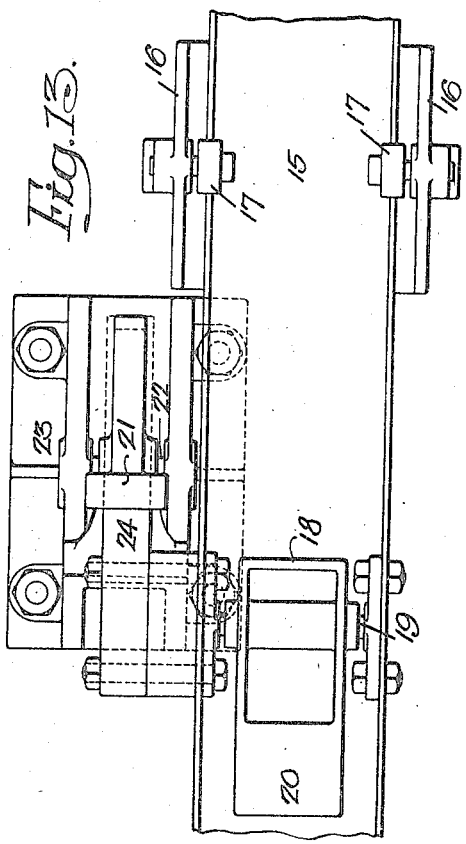

UNITED STATES PATENT OFFICE.

ELWOOD B. AYRES, OF PHILADELPHIA, PENNSYLVANIA, ASSIGNOR TO THE PHILADELPHIA TEXTILE MACHINERY COMPANY, OF PHILADELPHIA, PENNSYLVANIA, A CORPORATION OF PENNSYLVANIA.

DRYING APPARATUS.

1,161,587.   Specification of Letters Patent.   Patented Nov. 23, 1915.

Application filed June 4, 1915. Serial No. 32,137.

*To all whom it may concern:*

Be it known that I, ELWOOD B. AYRES, a citizen of the United States, residing in Philadelphia, Pennsylvania, have invented certain Improvements in Drying Apparatus, of which the following is a specification.

One object of my invention is to construct a brick drying machine so that the brick carriers are fed intermittently through the machine.

A further object of the invention is to provide means for dividing the drier into a series of chambers by curtains, so that the bricks can be subjected to different degrees of heat at different points throughout the drier.

A still further object of the invention is to provide a reciprocating bar having means to engage the several brick carriers and to move them forward at intervals; the bars being controlled by air under pressure.

Another object of the invention is to provide means for preventing the movement of the carriers when the curtains are down.

In the accompanying drawings:—Figure 1, is a side view of my improved brick drier; Fig. 2, is a plan view; Fig. 3, is an enlarged view at the rear end of the drier showing the foundation in section; Fig. 4, is an end view of the rear end of the drier; Fig. 5, is an enlarged plan view of a portion of the rear end of the drier; Fig. 6, is an enlarged longitudinal sectional view at the rear end of the drier, showing the reciprocating bar and the means for engaging the cars on which the bricks are carried; Fig. 7, is a plan view of the mechanism shown in Fig. 6; Fig. 8, is a sectional view on the line $a$—$a$, Fig. 6; Fig. 9, is a side view at the rear end of the drier, showing the mechanism for operating the curtains and for cutting off the supply of air; Fig. 10, is a sectional plan view on the line $b$—$b$, Fig. 9. Fig. 11, is an end view of Fig. 9; Fig. 12, is a side view, showing the reciprocating bar and the detent pawl for holding the axle; Fig. 13, is a plan view of Fig. 12; Fig. 14, is a transverse sectional view on the line $c$—$c$, Fig. 12; and Fig. 15, is a side view illustrating a modification of the means for controlling the curtains.

Referring in the first instance to Figs. 1 to 5 inclusive, 1 is the casing of the drier, which may be of any length desired, and this casing includes a central drying chamber 2 and side heating chambers 3 separated by longitudinal partitions 4 in which are openings for the circulating fans 5 which are mounted on the shafts 6 and are driven in any suitable manner such, for instance, as shown by dotted lines in Fig. 1, but I lay no claim to the method of driving these fans. In the heating chambers are coils of steam pipes 7 and the air circulates around these pipes and in the heating chambers and through the drying chamber.

8, 8 are exhaust pipes communicating with the upper portion of the drying chamber and in these exhaust pipes are exhaust fans 9 mounted on shafts 10, driven as shown in Fig. 1.

In the present instance, there are three tracks 11, which extend through the drying chamber, and 12, 12 are the trucks or cars which carry the material to be dried, which are bricks in the present instance. Each truck is mounted on two axles 13 having wheels 14, which travel on rails of the tracks 11 and these trucks or cars are moved intermittently through the machine from the end $x$ to the end $y$, as shown in Fig. 1.

There is a reciprocating bar 15 located between the wheels of each truck and this reciprocating bar extends throughout the length of the drier and is supported and guided by the bearings 16 having rollers 17 above and below the bar, as illustrated in Fig. 6. The bar, in the present instance, is in the form of a channel and mounted on the bar at intervals are pawls 18 which are pivoted at 19 and which are of such a height as to engage the axles 13 of the trucks or cars. Each pawl has a weight 20 which overbalances the projecting portion so as to hold this projecting portion in line with the axles but, when the reciprocating bar is retracted, the pawl can be turned on its pivot 19 when it strikes the front end of the axle so that it will pass under the axle and will engage the axle on its forward movement.

There is a detent pawl in front of each curtain to limit the movement of the trucks or cars, so that they will not interfere with the lowering of the curtains and, in Figs. 6 and 12, I have illustrated in detail the detent pawl at the delivery end of the drier.

The detent pawl 21 is pivoted at 22 to a bearing 23 located at one side of the reciprocating bar. This detent pawl is weighted so that it will fall back clear of the axle 13 of the car, as shown in Fig. 6, when the end car is to be moved out of the drier, but will hold the following car in position, which is brought up by the pawl 18, as shown in Fig. 12, as a tongue 24 secured to the side of the reciprocating bar 15, Fig. 13, passes under the pivot of the pawl 21 and raises it to the position shown in Fig. 12, but, as soon as the pawl 18 moves away from the axle 13 on the next reciprocation, the detent pawl 21 is released and assumes the position illustrated in Fig. 6.

There are three operating cylinders 25 which are located in a pit at the discharge end of the drier and below the level of the tracks, as shown clearly in Fig. 3, and in each cylinder is a piston connected to a piston rod 26 which is attached to a head 27 to which the reciprocating bars 15 are secured, as illustrated in Fig. 6. The head 27 has rollers 28 and beams 29 are located at each side of each head and act as guides and supports for the head and the rear end of the reciprocating bar.

There are two pipes 30 and 31 for each cylinder, one communicating with one end of the cylinder and the other communicating with the opposite end of the cylinder and each pair of pipes leads to a valve. The valve 32 controls the flow of air to the first cylinder 25; the valve $32^a$ controls the flow of air to the second cylinder $25^a$, and the valve $32^b$ controls the flow of air to the third cylinder $25^b$. These valves can be of the ordinary construction used in this type of apparatus and they are actuated by hand so that the cars on any one of the three tracks can be moved at will.

33 is the air supply pipe having branches 34 which lead to the several valves, and in this pipe 33 is a cut off valve 35 having an arm 36 which is connected by a rod 37 to one arm of a lever 38; the other arm of the lever being forked to engage a pin on a nut 39 adapted to slide in a frame 40. A screw 41 on a shaft 42 engages the nut and moves it longitudinally. On the shaft 42 is a handle 43 by which it is turned, and this shaft is the one which controls the movement of the several curtains and, in the present instance, has a sprocket wheel 44 around which passes a chain 45 to a sprocket wheel 46 on a longitudinal shaft 47 extending throughout the length of the machine. This shaft is geared to the three rollers 48, $48^a$ and $48^b$, in the present instance, on which the curtains 49 are mounted, so that the curtains will be raised and lowered in unison and at the same time the controlling valve 35 will be opened as the curtains are raised and will be closed when the curtains are lowered so as to prevent the accidental movement of the cars when the curtains are down.

In some instances, instead of using a manually operated means for raising and lowering the curtains, I may use the construction illustrated in Fig. 15, in which there is a longitudinally movable rack bar $47^a$ for the rack which engages the sprockets 50 on the rollers $48^d$ of the curtains. On the rack bar is an extension 51 which engages an arm $36^a$ on the spindle of the controlling valve $35^a$ of the supply pipe 33. At one side of the rack bar $47^a$ is a cylinder 52 having a piston provided with a rod 53 which is connected to an extension 54 on the rack bar, and this cylinder 52 is provided with air from a pipe 55. A valve 56 controls the flow of air to either end of the cylinder and this can be manually operated. The pipe 55 is connected to the supply pipe beyond the valve so that the air flowing to the cylinder 53 is not controlled by the valve $35^a$.

The operation is as follows: The material, bricks in the present instance, is loaded on the cars or trucks, as shown in the drawings, in any manner desired, and are pushed onto the tracks in front of the drier, as the object is to keep the drier entirely filled with bricks so that as soon as one car is discharged from one track another car takes its place at the rear of the line. On operating one of the valves 32, $32^a$ or $32^b$, the reciprocating bar is moved back so that the pawls 18 will drop back of an axle of a car and, as the bar moves forward, the pawls carry the car with them. The cars are stopped at the proper point in front of each curtain by a detent pawl 21, so as to retain the cars in the proper position. The last pawl 18 of the series, as illustrated in Fig. 6, engages the axle 13 of the first car and moves it out onto the tracks outside of the drier where it can be conveyed to any suitable point.

In order to regulate the heat of the drier and to make separate compartments, curtains are provided which are lowered after the cars have assumed their positions in the drier. There may be as many of these curtains as desired. In the drawings I have shown one at each end of the machine and one at the center. When the curtains are down it is impossible for the operator to shift the cars, since the cylinders cannot be supplied with air as the cut-off valve closes the air supply pipe, but the moment the curtains are raised this cut-off valve is opened, allowing air to pass to the valves of the cylinders so that, by turning any one of these valves, the particular reciprocating rod can be actuated and the cars can be moved.

I do not claim, in this application, the curtains located at each end of the drier and which also form the partitions, as this subject matter is fully set forth and claimed in the Patent granted to me on the 20th day of July, 1915, Numbered 1,147,593.

I claim:

1. The combination in a drier, of a casing; means for circulating heated air in the casing; a longitudinal track extending through the casing; reciprocating means located in the casing and having devices to engage the cars on the track and intermittently move them through the casing; and power mechanism for operating said reciprocating means.

2. The combination in a drier, of a central drying chamber extending from one end of the casing to the other; side chambers; heating pipes therein; circulating fans for circulating the heated air transversely through the drying chamber; a longitudinal track extending through the drying chamber; and reciprocating means for intermittently moving cars, containing the material to be dried, through the drying chamber.

3. The combination in a drier, of a casing inclosing a central longitudinal chamber and side heating chambers; circulating fans for circulating heated air in the drying chamber; means for closing both ends of the drying chamber; a longitudinal track extending through the said drying chamber; a reciprocating bar having pawls; cars mounted on the track and arranged to be engaged by the pawls; and means for reciprocating the bar so as to intermittently feed the cars through the drying chamber.

4. The combination in a drier, of a casing inclosing a central drying chamber and side heating chambers; a series of fans for circulating air in the drying chamber and heating chambers; means for closing both ends of the drying chamber; a track extending longitudinally through the drying chamber; a reciprocating bar; means for reciprocating said bar; a series of cars carrying the material to be dried arranged to travel on the tracks; pawls on the reciprocating bar arranged to engage the cars and to push them forward intermittently; and mechanism for operating the means for closing both ends of the casing; said mechanism also controlling the means for reciprocating the bars.

5. The combination in a drier, of a casing inclosing a drying chamber and a heating chamber; means for circulating the air therein; a longitudinal track extending through the drying chamber; a longitudinally arranged reciprocating bar also extending through the drying chamber; a series of pivoted pawls on the bar; cars arranged to carry the material to be dried, the pawls engaging the axles of said cars; and means for reciprocating the said bars.

6. The combination in a drier, of a casing inclosing the drying chamber and a heating chamber; means for circulating the air in the two chambers; a longitudinal track in the drying chamber; a longitudinally arranged reciprocating bar in close proximity to the track; cars arranged to travel on the tracks and carrying the material to be dried; pivoted pawls on the bar arranged to engage the axles of the cars; a detent pawl for limiting the movement of the last car of the series; and means on the bar for holding the detent in position, the detent being released when the car is to be discharged from the drier; and means for reciprocating the bar.

7. The combination in a drier, of a casing inclosing a drying chamber and a heating chamber; means for circulating the air in the two chambers; a series of curtains arranged to divide the drying chamber into a series of compartments; a longitudinal track extending through the drying chamber; cars arranged to travel on said track; a reciprocating bar located between the tracks and having pawls engaging the cars; a cylinder; a piston therein having a rod, said rod being connected to the reciprocating rod; pipes leading to the cylinder; a valve for controlling the passage of fluid to the cylinder; means for actuating the curtains; and a controlling valve in the supply pipe actuated by the curtain operating means so that the curtains will be raised before the cars are moved.

8. The combination in a drier, of a casing inclosing a drying chamber; means for intermittently feeding material through said chamber; a curtain arranged to divide the chamber; a shaft; a gearing for raising and lowering the curtain; a screw on said shaft; a nut traversed by the screw; a lever controlled by the nut; a supply pipe; a controlling valve in the pipe connected to said lever; a reciprocating bar arranged to intermittently move the material to be dried; a cylinder having a piston and rod connected to the reciprocating bar; pipe leading from the supply pipe to the cylinder; and a valve for controlling the flow of fluid to either end of the cylinder.

9. The combination in a drier, of a casing inclosing the drying chamber and a heating chamber; fans for circulating the air through the two chambers; a series of longitudinal tracks arranged side by side and extending throughout the length of the drying chamber; cars mounted on the tracks for carrying the material to be dried; reciprocating bars located between the rails of each track; pivoted pawls on the bars; cylinders having pistons connected to the bars; pipes leading to both ends of each cylinder; a valve for each cylinder arranged to control the flow of fluid to either end of the cylinders; a supply pipe common to all of the cylinders; a controlling valve in the supply pipe; a series of curtains for closing both ends of the drier and for forming a temporary partition therein; means for raising and lowering said curtains; and means connecting the curtain operating means with the controlling valve so that the valve is closed when the curtains are down and opened when the curtains are raised to prevent the movement of the cars when the curtains are down.

10. The combination in a drier, of a casing inclosing the drying chamber; means for circulating heated air in the drying chamber; a longitudinal track extending through the drying chamber; a reciprocating bar for moving the material to be dried on the tracks; a head to which each of the reciprocating bars is secured; a cylinder; a piston therein, the piston rod extending from the piston and attached to said head; means for supplying fluid to the cylinders; longitudinally arranged beams; and rollers on the head located above and below the beams, said beams acting as tracks along which the head is actuated.

ELWOOD B. AYRES.